July 24, 1928.

C. J. STROSACKER ET AL 1,678,619

MANUFACTURE OF INDIGO

Filed Feb. 20, 1924

INVENTORS
Charles J. Strosacker and
BY Chester C. Kennedy

Fay, Oberlin & Fay
ATTORNEYS

Patented July 24, 1928.

1,678,619

UNITED STATES PATENT OFFICE.

CHARLES J. STROSACKER AND CHESTER C. KENNEDY, OF MIDLAND, MICHIGAN, ASSIGNORS TO THE DOW CHEMICAL COMPANY, OF MIDLAND, MICHIGAN, A CORPORATION OF MICHIGAN.

MANUFACTURE OF INDIGO.

Application filed February 20, 1924. Serial No. 694,118.

The present improvements, relating, as indicated, to the manufacture of indigo, have more particular regard to a method of handling the fused indoxyl that is produced at one stage in such manufacture where the general process followed is that of Heumann. As is well known, in accordance with such process indoxyl is made from phenylglycine or phenylglycocol by treating the latter at a suitable elevated temperature with caustic soda or caustic potash admixed with quicklime or other ingredients, as described for example in U. S. patent to Gifford No. 617,652, dated January 10, 1899, and in U. S. patent to Cone Re. No. 14,364, dated September 25, 1917. According to the original Heumann disclosure (U. S. Patent No. 617,652 supra) the resultant fused mixture or melt was allowed to cool and then dissolved in water, and instead of this one of the improvements made by Cone consisted in running the mass while still fused or molten into water out of contact with air, whereupon the indoxyl goes into solution.

The present improved procedure has as its object the more convenient manipulation of the fused indoxyl mass or melt obtained as aforesaid incidentally to the introduction of the same into water as is necessary to obtain a solution of such indoxyl. To this and related ends, the invention, then, consists of the steps hereinafter fully described and particularly pointed out in the claims, the annexed drawing and the following description setting forth but one of several ways in which the principle of the invention may be carried out.

In said annexed drawing:—

Figure 1:
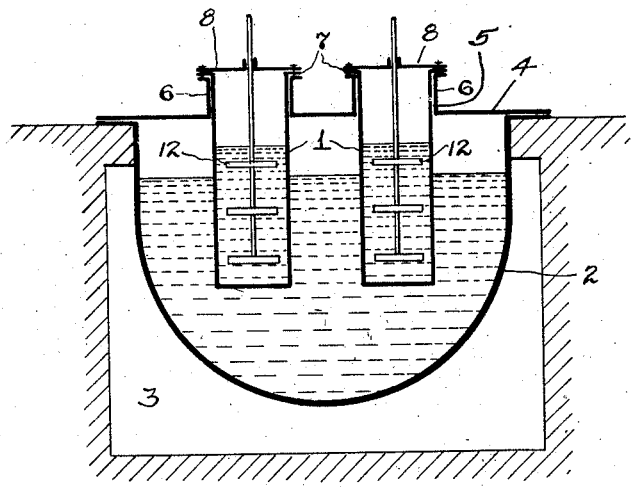
Figure 2:
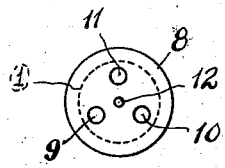
Figure 3:
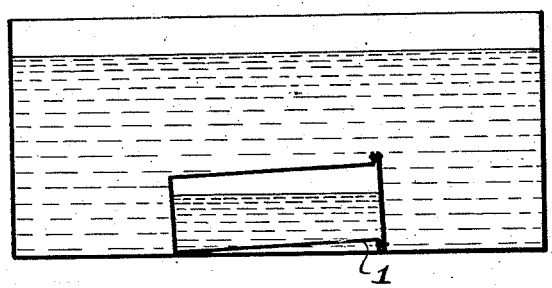

Fig. 1 is a diagrammatic representation of a fusion pot or kettle wherein the indoxyl melt is prepared according to our present improved method of manufacture; Fig. 2 is a plan view of the fusion pot or kettle; and Fig. 3 diagrammatically illustrates the manner in which the contents of such pot are transferred to a body of water for the purpose of dissolving the indoxyl.

In carrying out the present improved method in accordance with the specific method of the aforesaid Cone patent, the proper amounts of potassium and sodium hydroxides, etc. are melted together in an iron or steel pot or fusion kettle 1, as usual. This pot, however, as shown in Fig. 1, is cylindrical instead of the familiar form, and the size of such pot moreover is relatively small, being designed to produce approximately 600 pounds of 20 per cent paste per batch. During the preparation of the melt, such pot, or a plurality of similar pots, as shown in Fig. 1, are set in a larger containing vessel 2 wherein is maintained a bath of caustic through which the heat from the outer surrounding furnace chamber 3 is transmitted. This arrangement, it should be noted, greatly facilitates the proper control of the temperature of the melt within the pot, as also the subsequent manipulation of the pot, as will presently be described.

The vessel 2 is provided with a cover 4 formed with openings 5 through which the pots 1 are inserted into the bath in said vessel. Flanged collars 6 surrounding the openings serve to support the pots at the proper height by engaging with corresponding flanges 7 thereon.

In melting down the previously mentioned ingredients, and more particularly following the addition thereto of the phenylglycine, it is desirable that the pots 1 be closed, and to this end covers or lids 8 are bolted or otherwise secured thereto, each such cover having suitable apertures 9, 10 and 11 through which access to the interior of the pot may be had. Suitable feed tubes (not shown) will be removably inserted in two such openings and through these tubes the metallic sodium referred to in the Cone Patent and the phenylglycine are respectively fed when the mixture of caustic and lime in the pot has been brought to the proper temperature. The third aperture is designed to be connected with a suitable vent for the escape of gases, while for the purpose of commingling the various ingredients, a rotary stirrer 12 is mounted in the pot with its spindle projecting through the lid for driving connection. Furthermore, if desired, an atmosphere of neutral gases may be maintained in the space between the lid and the surface of the molten mass in the pot.

The feed tubes and vent will be disconnected from the respective openings in the lid as soon as the introduction of material is accomplished, and as soon as the reaction, which follows the introduction of the phenylglycine is completed, the pot with its contents is lifted bodily from the caustic bath in vessel 2 and thereupon transferred to a body of water in a conveniently adjacent tank, such body of water being large enough to receive and wholly immerse the pot, or several pots, where operated two at a time as in the example given. The pots are laid on their sides as shown in Fig. 3, so as to discharge their contents through openings 9, 10 and 11 into such body of water, such discharge being obviously accomplished wholly out of contact with the air.

When the transfer is quickly made, the openings in question need not be closed, but suitable supplemental lids or plugs may be used for this purpose, if desired.

It should be noted that the addition of the phenyl-glycine to the fusion mixture tends to thicken the latter and such addition may be carried to a point where the mixture becomes too thick to run readily, although the reaction whereby the indoxyl is formed will still continue satisfactorily. By our present improved procedure this increase in stiffness in the mass does not affect the transfer thereof to the body of water and the mass can be removed at leisure from the pot after it has been submerged as described. Such removal of course is facilitated by the fact that the indoxyl readily goes into solution, and the resulting solution will contain a proportionately larger amount of the indoxyl than where obtained by prevailing methods of transfer. After the pot has been emptied of its contents it will of course be replaced in a bath over the furnace and is then ready for the preparation of another batch of the material.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In the manufacture of indigo, the steps which consist in subjecting a phenyl compound with an alkali in a container to the heat of a bath of molten material of about the same melting point as the alkali, and finally removing the container from such heated zone and without material access of air submerging it in water.

2. In the manufacture of indigo, the steps which consist in subjecting a phenyl compound with an alkali in a container to the heat of a bath of molten caustic, and finally removing the container from such heated zone and without material access of air submerging it in water.

3. In the manufacture of indigo, the step which consists in subjecting a phenyl compound with an alkali in a container to the heat of a bath of molten material of about the same melting point and heat transmission characteristics as the alkali.

4. In the manufacture of indigo, the step which consists in subjecting a phenyl compound with an alkali in a container to the heat of a bath of molten caustic alkali.

5. In the manufacture of indigo, the steps which consist in fusing phenyl-glycine with an alkali in a container, and then removing the container, without material access of air, to a body of water and submerging it therein.

Signed by us this 15th day of February, 1924.

CHARLES J. STROSACKER.
CHESTER C. KENNEDY.